(12) United States Patent
Nanba

(10) Patent No.: US 9,574,020 B2
(45) Date of Patent: Feb. 21, 2017

(54) PRODUCTION METHOD FOR FLUOROPOLYMER AQUEOUS DISPERSION

(71) Applicant: DAIKIN INDUSTRIES, LTD., Osaka-shi, Osaka (JP)

(72) Inventor: Yoshinori Nanba, Settsu (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 14/648,366

(22) PCT Filed: Dec. 2, 2013

(86) PCT No.: PCT/JP2013/082351
§ 371 (c)(1),
(2) Date: May 29, 2015

(87) PCT Pub. No.: WO2014/084397
PCT Pub. Date: Jun. 5, 2014

(65) Prior Publication Data
US 2015/0299341 A1    Oct. 22, 2015

Related U.S. Application Data

(60) Provisional application No. 61/731,880, filed on Nov. 30, 2012.

(51) Int. Cl.
  *C08L 27/18*   (2006.01)
  *C08F 2/10*    (2006.01)
  *C08F 2/26*    (2006.01)
  *C08F 14/18*   (2006.01)

(52) U.S. Cl.
  CPC . *C08F 2/10* (2013.01); *C08F 2/26* (2013.01); *C08F 14/18* (2013.01); *C08L 27/18* (2013.01); *C08L 2201/54* (2013.01)

(58) Field of Classification Search
  CPC ............. C08L 27/18; C08F 2/10; C08F 2/26; C08F 14/18
  USPC ...................................................... 524/805
  See application file for complete search history.

(56) References Cited

U.S. PATENT DOCUMENTS

| | | | |
|---|---|---|---|
| 2,559,752 A | 7/1951 | Berry | |
| 6,156,839 A | 12/2000 | Wu et al. | |
| 6,297,334 B1 | 10/2001 | Marchese et al. | |
| 6,310,142 B1 | 10/2001 | Apostolo et al. | |
| 6,395,834 B1 | 5/2002 | Albano et al. | |
| 6,395,848 B1 | 5/2002 | Morgan et al. | |
| 6,509,429 B1 | 1/2003 | Kitaichi et al. | |
| 2007/0135558 A1 | 6/2007 | Tsuda et al. | |
| 2008/0200571 A1 | 8/2008 | Higuchi et al. | |
| 2008/0200627 A1 | 8/2008 | Funaki et al. | |
| 2010/0160465 A1 | 6/2010 | Aten et al. | |
| 2010/0160490 A1* | 6/2010 | Leffew | C08F 14/18 523/201 |
| 2010/0204345 A1 | 8/2010 | Yamanaka et al. | |
| 2011/0015342 A1 | 1/2011 | Kose et al. | |
| 2012/0028046 A1 | 2/2012 | Ono et al. | |
| 2014/0031469 A1 | 1/2014 | Tanimoto et al. | |

FOREIGN PATENT DOCUMENTS

| | | | |
|---|---|---|---|
| CN | 1875035 A | 12/2006 | |
| EP | 1029875 A1 | 8/2000 | |
| EP | 1031607 A1 | 8/2000 | |
| EP | 1492827 | 1/2005 | |
| GB | 2327087 A | 1/1999 | |
| JP | 2000-34309 A | 2/2000 | |
| JP | 2000-239321 A | 9/2000 | |
| JP | 2000-239470 A | 9/2000 | |
| JP | 2003-500495 A | 1/2003 | |
| JP | WO 2008001894 A1 * | 1/2008 | ............ C08F 214/18 |
| JP | 2009-155558 A | 7/2009 | |
| JP | 2009155558 A * | 7/2009 | |
| JP | 2010-180364 A | 8/2010 | |
| JP | 4714991 B2 | 7/2011 | |
| JP | 2012-513530 A | 6/2012 | |
| JP | 2012-513535 A | 6/2012 | |
| JP | 2012-214766 A | 11/2012 | |
| WO | 2007/046345 A1 | 4/2007 | |
| WO | 2007/046377 A1 | 4/2007 | |
| WO | 2008/001894 A1 | 1/2008 | |
| WO | 2009/020187 A1 | 2/2009 | |
| WO | 2009/119202 A1 | 10/2009 | |
| WO | 2010/113950 A1 | 10/2010 | |
| WO | 2013/115278 A1 | 8/2013 | |

OTHER PUBLICATIONS

Machine translation of JP 2009-155558 of record May 29, 2015, 2009.
Machine translation of WO 2008/001894 of record May 29, 2015, 2008.

* cited by examiner

*Primary Examiner* — Kelechi Egwim
(74) *Attorney, Agent, or Firm* — Sughrue Mion, PLLC

(57) ABSTRACT

The present invention aims to provide a method of producing a fluoropolymer aqueous dispersion having a significantly small particle size and excellent dispersion stability without using a long-chain fluorosurfactant. The present invention relates to a method of producing an aqueous dispersion containing at least one fluoropolymer selected from the group consisting of polytetrafluoroethylene and melt-processible fluororesins excluding polytetrafluoroethylene. The method includes polymerizing a fluoromonomer in an aqueous medium in the presence of a fluorosurfactant having a Log POW value of not higher than 3.4 and a polymerization initiator. The amount of the fluorosurfactant corresponds to 4600 to 500000 ppm of the aqueous medium.

6 Claims, No Drawings

PRODUCTION METHOD FOR FLUOROPOLYMER AQUEOUS DISPERSION

CROSS REFERENCE TO RELATED APPLICATIONS

This application is a National Stage of International Application No. PCT/JP2013/082351 filed Dec. 2, 2013, claiming priority based on U.S. Provisional Application No. 61/731,880 filed Nov. 30, 2012, the contents of all of which are incorporated herein by reference in their entirety.

TECHNICAL FIELD

The present invention relates to a method of producing a fluoropolymer aqueous dispersion.

BACKGROUND ART

Fluororesin aqueous dispersions are usually produced by emulsion polymerizing a fluoromonomer in the presence of a fluorosurfactant. Conventional fluorosurfactants are long-chain fluorosurfactants such as perfluorooctanoic acid or its salt.

However, Patent Literature 1 discloses that the persons and parties involved have proposed to control disposal of ammonium perfluorooctanoate, which does not exist in the natural world and is difficult to decompose, in consideration of the environment, and they also have indicated that the substance is highly bioaccumulative.

Thus, Patent Literature 1 discloses a polytetrafluoroethylene aqueous emulsion obtained by emulsion polymerizing tetrafluoroethylene alone or with a monomer copolymerizable therewith in an aqueous medium using a fluorinated emulsifier represented by the formula (1): $XCF_2CF_2(O)_m CF_2CF_2OCF_2COOA$ (wherein X represents a hydrogen atom or a fluorine atom; A represents a hydrogen atom, an alkali metal, or $NH_4$; and m is an integer of 0 or 1) in an amount of 1500 to 20000 ppm based on the final yield of polytetrafluoroethylene.

Patent Literature 2 discloses a low molecular weight polytetrafluoroethylene aqueous dispersion produced by a method of producing a low molecular weight polytetrafluoroethylene, comprising emulsion polymerizing tetrafluoroethylene alone or tetrafluoroethylene and a modifying monomer copolymerizable with the tetrafluoroethylene in an aqueous medium in the presence of a reactive compound and a chain-transfer agent, wherein the reactive compound has a hydrophilic group and a functional group that is reactive in radical polymerization, and the amount of the reactive compound is more than the amount corresponding to 10 ppm based on the amount of the aqueous medium.

Further, Patent Literature 3 discloses an aqueous dispersion of fluoropolymer particles produced by a method of producing an aqueous dispersion of fluoropolymer particles, comprising the steps of: preparing dispersed particles of a fluorinated ionomer in an aqueous polymerization medium; and polymerizing at least one fluorinated monomer in the presence of the dispersed particles of the fluorinated ionomer and an initiator in the aqueous polymerization medium to form an aqueous dispersion of fluoropolymer particles.

CITATION LIST

Patent Literature

Patent Literature 1: WO 2007/046345
Patent Literature 2: JP 2010-180364 A
Patent Literature 3: JP 2012-513530 T

SUMMARY OF INVENTION

Technical Problem

In the conventional techniques, polymerization of a fluoromonomer using a fluorosurfactant which is not a long-chain fluorosurfactant tends to provide fluororesin particles having a large particle size. Further, such particles tend to have poor dispersion stability, resulting in problems such as sticking of the polymer to an agitator during the polymerization. In particular, it is not easy to produce a fluoropolymer aqueous dispersion having a sufficiently small particle size and excellent dispersion stability.

The present invention is devised in the aforementioned situation, and aims to provide a method of producing a fluoropolymer aqueous dispersion having a significantly small particle size and excellent dispersion stability without a long-chain fluorosurfactant.

Solution to Problem

The present inventor has performed various studies on a method of producing an aqueous dispersion containing at least one fluoropolymer selected from the group consisting of polytetrafluoroethylene and melt-processible fluororesins excluding polytetrafluoroethylene by polymerizing a fluoromonomer in an aqueous medium in the presence of a fluorosurfactant and a polymerization initiator. Then, the inventor has found that a large amount of a fluorosurfactant having a Log POW value within a specific range in the polymerization can provide an aqueous dispersion which contains fluoropolymer particles having a significantly small volume average particle size without a conventionally used long-chain fluorosurfactant. Finally, the inventor has arrived at the present invention.

Specifically, the present invention relates to a method of producing an aqueous dispersion containing at least one fluoropolymer selected from the group consisting of polytetrafluoroethylene and melt-processible fluororesins excluding polytetrafluoroethylene, the method comprising polymerizing a fluoromonomer in an aqueous medium in the presence of a fluorosurfactant having a Log POW value of not higher than 3.4 and a polymerization initiator, the amount of the fluorosurfactant corresponding to 4600 to 500000 ppm of the aqueous medium.

The fluorosurfactant is preferably a fluorinated compound represented by the following formula (1):

$$X—(CF_2)_{m1}—Y \qquad (1)$$

wherein X represents H or F; m1 is an integer of 3 to 5; and Y represents $—SO_3M$, $—SO_4M$, $—SO_3R$, $—SO_4R$, $—COOM$, $—PO_3M_2$, or $—PO_4M_2$, where M represents H, $NH_4$, or an alkali metal, and R represents a C1-C12 alkyl group.

The polymerization is preferably performed in the absence of a fluorinated compound represented by the following formula (2):

$$X—(CF_2)_{m2}—Y \qquad (2)$$

wherein X represents H or F; m2 is an integer of 6 or greater; and Y represents $—SO_3M$, $—SO_4M$, $—SO_3R$, $—SO_4R$, $—COOM$, $—PO_3M_2$, or $—PO_4M_2$, where M represents H, $NH_4$, or an alkali metal, and R represents a C1-C12 alkyl group.

The fluoropolymer preferably has a volume average particle size of not smaller than 0.1 nm but smaller than 20 nm.

The polymerization initiator is preferably at least one selected from the group consisting of persulfates and organic peroxides.

The amount of the polymerization initiator preferably corresponds to 1 to 5000 ppm of the aqueous medium.

Advantageous Effects of Invention

The method of producing a fluoropolymer aqueous dispersion of the present invention can provide an aqueous dispersion which contains fluoropolymer particles having a significantly small particle size and which is excellent in dispersion stability without a long-chain fluorosurfactant.

DESCRIPTION OF EMBODIMENTS

Before the specific description of the present invention, the terms used herein are defined or described below.

The term "fluororesin" herein means a partially crystalline fluoropolymer, and is not fluororubber but fluoroplastic. The fluororesin has a melting point and is a thermoplastic material. It may be melt-processible or non-melt-processible.

The term "melt-processible" herein means that a polymer can be molten and then processed using a conventional processing device such as an extruder or an injection molding device. Thus, a melt-processible fluororesin usually has a melt flow rate of 0.01 to 500 g/10 min, which is measured by the method to be mentioned later.

The term "perfluororesin" herein means a resin comprising a perfluoropolymer in which all the monovalent atoms bonded with the carbon atoms constituting the main chain of the polymer are fluorine atoms. Here, the carbon atoms constituting the main chain of the polymer may be bonded with not only the monovalent atoms (fluorine atoms) but also groups such as alkyl groups, fluoroalkyl groups, alkoxy groups, and fluoroalkoxy groups. Some fluorine atoms bonded with the carbon atoms constituting the main chain of the polymer may be replaced by chlorine atoms. Polymer end groups, in other words, groups terminating the polymer chain, may comprise an atom other than fluorine. Most polymer end groups are derived from a polymerization initiator or a chain-transfer agent used for the polymerization reaction.

The term "fluororubber" herein means an amorphous fluoropolymer. The term "amorphous" herein means that the fluoropolymer has a melting peak (ΔH) of 4.5 J/g or lower determined by differential scanning calorimetry (DSC) (temperature increasing rate: 10° C./min) or differential thermal analysis (DTA) (temperature-increasing rate: 10° C./min). When it is crosslinked, the fluororubber shows elastomeric characteristics. The term "elastomeric characteristics" herein means that the polymer can be stretched and, when released from the force for stretching the polymer, the polymer can return to the original length and maintain this original length.

The term "perfluoromonomer" herein means a monomer having no carbon-hydrogen bond in a molecule. The perfluoromonomer may be a monomer which contains the carbon atoms and the fluorine atoms and in which some of the fluorine atoms bonded with the carbon atoms may be replaced by chlorine atoms. It may also be a monomer having not only carbon atoms but also a nitrogen atom, an oxygen atom, and a sulfur atom. The perfluoromonomer is preferably a monomer in which all the hydrogen atoms are replaced by fluorine atoms. The perfluoromonomer does not include monomers that give a crosslinking site.

The term "monomer that gives a crosslinking site" herein means a monomer (cure-site monomer) having a crosslinkable group that can give a fluoropolymer a crosslinking site for forming a crosslink by a curing agent.

The term "polytetrafluoroethylene (PTFE)" herein preferably means a fluoropolymer including 99 mol % or more of tetrafluoroethylene based on the amounts of all the polymer units.

The term "fluororesin (excluding polytetrafluoroethylene)" herein preferably means a fluoropolymer including less than 99 mol % of tetrafluoroethylene based on the amounts of all the polymer units.

The "amounts of the respective monomers constituting a fluoropolymer" herein can be calculated by appropriate combination of NMR, FT-IR, elemental analysis, and X-ray fluorescence analysis in accordance with the types of the monomers.

The present invention is described in detail below.

In the method of producing a fluoropolymer aqueous dispersion of the present invention, a fluoromonomer is polymerized in an aqueous medium in the presence of a fluorosurfactant having a Log POW value of not higher than 3.4 and a polymerization initiator to provide an aqueous dispersion containing at least one fluoropolymer selected from the group consisting of polytetrafluoroethylene (PTFE) and melt-processible fluororesins excluding polytetrafluoroethylene.

The amount of the fluorosurfactant used in the production method of the present invention corresponds to 4600 to 500000 ppm of the aqueous medium. Too small an amount of the fluorosurfactant fails to give an aqueous dispersion containing fluoropolymer particles having a small volume average particle size. Too large an amount thereof fails to exert its effects that correspond to the amount, which is economically disadvantageous. The amount of the fluorosurfactant is preferably 18,000 ppm or more, more preferably 20,000 ppm or more, still more preferably 23,000 ppm or more, and particularly preferably 38,000 ppm or more, whereas the amount is preferably 400,000 ppm or less, and more preferably 300,000 ppm or less.

The fluorosurfactant has a Log POW value of not higher than 3.4. The Log POW value is a 1-octanol/water partition coefficient which is represented by Log P (wherein P is the ratio between the concentration of the fluorosurfactant in octanol and that in water in a phase-separated octanol/water (1:1) liquid mixture containing the fluorosurfactant). The Log POW value is preferably 1.5 or higher. In order to make it easy to remove the surfactant from the fluoropolymer, the value is preferably 3.0 or lower, and more preferably 2.8 or lower.

The Log POW value is determined as follows. Specifically, HPLC is performed on standard substances (heptanoic acid, octanoic acid, nonanoic acid, and decanoic acid) each having a known octanol/water partition coefficient using TOSOH ODS-120T ($\phi$4.6 mm×250 mm) as a column and acetonitrile/0.6% by mass $HClO_4$ aqueous solution (=1/1 (vol/vol %)) as an eluent, at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on this calibration curve, the Log POW value is calculated from the elution time of the sample liquid in HPLC.

The fluorosurfactant having a Log POW value of not higher than 3.4 is preferably an anionic fluorosurfactant, and examples thereof include those described in US 2007/

0015864, US 2007/0015865, US 2007/0015866, US 2007/0276103, US 2007/0117914, US 2007/142541, US 2008/0015319, U.S. Pat. No. 3,250,808, U.S. Pat. No. 3,271,341, JP 2003-119204 A, WO 2005/042593, WO 2008/060461, WO 2007/046377, WO 2007/119526, WO 2007/046482, and WO 2007/046345.

The fluorosurfactant having a Log POW value of not higher than 3.4 is preferably an anion surfactant.

The anion surfactant is preferably a carboxylic acid surfactant or a sulfonic acid surfactant, for example. Examples of the surfactants include those comprising perfluorocarboxylic acids (I) represented by the following formula (I), ω-H perfluorocarboxylic acids (II) represented by the following formula (II), perfluoropolyether carboxylic acids (III) represented by the following formula (III), perfluoroalkyl alkylene carboxylic acids (IV) represented by the following formula (IV), perfluoroalkoxy fluorocarboxylic acids (V) represented by the following formula (V), perfluoroalkyl sulfonic acids (VI) represented by the following formula (VI), and/or perfluoroalkyl alkylene sulfonic acids (VII) represented by the following formula (VII).

The perfluorocarboxylic acid (I) is represented by the following formula (I):

$$F(CF_2)_{n1}COOM \qquad (I)$$

wherein n1 is an integer of 3 to 6; and M represents H, $NH_4$, or an alkali metal element.

In the formula (I), the lower limit of n1 is preferably 4 in order to achieve good stability of the polymerization reaction. M is preferably $NH_4$ because it is less likely to remain during processing of the resulting fluoropolymer aqueous dispersion.

For example, the perfluorocarboxylic acid (I) is preferably $F(CF_2)_6COOM$, $F(CF_2)_5COOM$, or $F(CF_2)_4COOM$, where M is defined as mentioned above.

The ω-H perfluorocarboxylic acid (II) is represented by the following formula (II):

$$H(CF_2)_{n2}COOM \qquad (II)$$

wherein n2 is an integer of 4 to 8; and M is defined as mentioned above.

In the formula (II), the upper limit of n2 is preferably 6 in order to achieve good stability in the polymerization reaction. M is preferably $NH_4$ because it is less likely to remain during processing of the resulting fluoropolymer aqueous dispersion.

For example, the ω-H perfluorocarboxylic acid (II) is preferably $H(CF_2)_8COOM$, $H(CF_2)_7COOM$, $H(CF_2)_6COOM$, $H(CF_2)_5COOM$, or $H(CF_2)_4COOM$, where M is defined as mentioned above.

The perfluoropolyether carboxylic acid (III) is represented by the following formula (III):

$$Rf^1—O—(CF(CF_3)CF_2O)_{n3}CF(CF_3)COOM \qquad (III)$$

wherein $Rf^1$ represents a C1-C5 perfluoroalkyl group; n3 is an integer of 0 to 3; and M is defined as mentioned above.

In the formula (III), $Rf^1$ is preferably a C4 or lower perfluoroalkyl group and n3 is preferably 0 or 1 in order to achieve good stability in the polymerization, and M is preferably $NH_4$ because it is less likely to remain during processing of the resulting fluoropolymer aqueous dispersion.

For example, the perfluoropolyether carboxylic acid (III) is preferably $C_4F_9OCF(CF_3)COOM$, $C_3F_7OCF(CF_3)COOM$, $C_2F_5OCF(CF_3)COOM$, $CF_3OCF(CF_3)COOM$, or $CF_3OCF(CF_3)CF_2OCF(CF_3)COOM$, where M is defined as mentioned above. In order to achieve good stability in the polymerization and good removing efficiency, it is more preferably $CF_3OCF(CF_3)COOM$ or $CF_3OCF(CF_3)CF_2OCF(CF_3)COM$, where M is defined as mentioned above.

The perfluoroalkyl alkylene carboxylic acid (IV) is represented by the following formula (IV):

$$Rf^2(CH_2)_{n4}Rf^3COOM \qquad (IV)$$

wherein $Rf^2$ represents a C1-C5 perfluoroalkyl group; $Rf^3$ represents a C1-C3 linear or branched perfluoroalkylene group; n4 is an integer of 1 to 3; and M is defined as mentioned above.

In the formula (IV), $Rf^2$ is preferably a C2 or higher perfluoroalkyl group or a C4 or lower perfluoroalkyl group. $Rf^3$ is preferably a C1 or C2 perfluoroalkylene group, and more preferably $—(CF_2)—$ or $—CF(CF_3)—$. Further, n4 is preferably 1 or 2, and more preferably 1. M is preferably $NH_4$ because it is less likely to remain during processing of the resulting fluoropolymer aqueous dispersion.

For example, the perfluoroalkyl alkylene carboxylic acid (IV) is preferably $C_4F_9CH_2CF_2COOM$, $C_3F_7CH_2CF_2COOM$, $C_2F_5CH_2CF_2COOM$, $C_4F_9CH_2CF(CF_3)COOM$, $C_3F_7CH_2CF(CF_3)COOM$, $C_2F_5CH_2CF(CF_3)COOM$, $C_4F_9CH_2CH_2CF_2COOM$, $C_3F_7CH_2CH_2CF_2COOM$, or $C_2F_5CH_2CH_2CF_2COOM$, where M is defined as mentioned above.

The perfluoroalkoxy fluorocarboxylic acid (V) is represented by the following formula (V):

$$Rf^4—O—CY^1Y^2CF_2—COOM \qquad (V)$$

wherein $Rf^4$ represents a C1-C5 perfluoroalkyl group; $Y^1$ and $Y^2$ may be the same as or different from each other, and represent H or F; and M is defined as mentioned above.

In the formula (V), $Rf^4$ is preferably a C1-C3 perfluoroalkyl group, and more preferably a C3 perfluoroalkyl group in order to achieve good polymerization stability. M is preferably $NH_4$ because it is less likely to remain during processing of the resulting fluoropolymer aqueous dispersion.

For example, the perfluoroalkoxy fluorocarboxylic acid (V) is preferably $C_3F_7OCH_2CF_2COOM$, $C_3F_7OCHFCF_2COOM$, or $C_3F_7OCF_2CF_2COOM$, where M is defined as mentioned above.

The perfluoroalkyl sulfonic acid (VI) is represented by the following formula (VI):

$$F(CF_2)_{n5}SO_3M \qquad (VI)$$

wherein n5 is an integer of 3 to 6; and M is defined as mentioned above.

In the formula (VI), n5 is preferably an integer of 4 or 5 in order to achieve good polymerization stability, and M is preferably $NH_4$ because it is less likely to remain during processing of the resulting fluoropolymer aqueous dispersion.

For example, the perfluoroalkyl sulfonic acid (VI) is preferably $F(CF_2)_5SO_3M$ or $F(CF_2)_5SO_3M$, where M is defined as mentioned above.

The perfluoroalkyl alkylene sulfonic acid (VII) is represented by the following formula (VII):

$$Rf^5(CH_2)_{n6}SO_3M \qquad (VII)$$

wherein $Rf^5$ represents a 1 to 5 perfluoroalkyl group; n6 is an integer of 1 to 3; and M is defined as mentioned above.

In the formula (VII), $Rf^5$ is preferably a C1-C3 perfluoroalkyl group, and more preferably a C3 perfluoroalkyl group. Further, n6 is preferably 1 or 2, and more preferably 1. M is preferably $NH_4$ because it is less likely to remain during processing of the resulting fluoropolymer aqueous dispersion.

For example, the perfluoroalkyl alkylene sulfonic acid (VII) is preferably $C_3F_7CH_2SO_3M$ wherein M is defined as mentioned above.

The fluorosurfactant having a Log POW value of not higher than 3.4 is preferably at least one selected from the group consisting of:

the fluorinated compounds represented by the following formula (1):

$$X\text{—}(CF_2)_{m1}\text{—}Y \quad (1)$$

wherein X represents H or F; m1 is an integer of 3 to 5; and Y represents —$SO_3M$, —$SO_4M$, —$SO_3R$, —$SO_4R$, —COOM, —$PO_3M_2$, or —$PO_4M_2$, where M represents H, $NH_4$, or an alkali metal, and R represents a C1-C12 alkyl group;

the ω-H perfluorocarboxylic acids (II) represented by the formula (II);

the perfluoropolyether carboxylic acids (III) represented by the formula (III);

the perfluoroalkyl alkylene carboxylic acids (IV) represented by the formula (IV);

the perfluoroalkoxy fluorocarboxylic acids (V) represented by the formula (V); and the perfluoroalkyl alkylene sulfonic acid (VII) represented by the formula (VII).

The fluorosurfactant having a Log POW value of not higher than 3.4 is more preferably at least one selected from the group consisting of:

the fluorinated compounds represented by the following formula (1):

$$X\text{—}(CF_2)_{m1}\text{—}Y \quad (1)$$

wherein X represents H or F; m1 is an integer of 3 to 5; and Y represents —$SO_3M$, —$SO_4M$, —$SO_3R$, —$SO_4R$, —COOM, —$PO_3M_2$, or —$PO_4M_2$, where M represents. H, $NH_4$, or an alkali metal, and R represents a C1-C12 alkyl group;

the fluorinated compounds represented by the following formula (3):

$$CF_3OCF(CF_3)CF_2OCF(CF_3)COOX \quad (3)$$

wherein X represents a hydrogen atom, $NH_4$, or an alkali metal atom; and the fluorinated compounds represented by the following formula (4):

$$CF_3CF_2OCF_2CF_2OCF_2COOX \quad (4)$$

wherein X represents a hydrogen atom, $NH_4$, or an alkali metal atom.

The fluorosurfactant having a Log POW value of not higher than 3.4 is still more preferably a fluorinated compound represented by the following formula (1):

$$X\text{—}(CF_2)_{m1}\text{—}Y \quad (1)$$

wherein X represents H or F; m1 is an integer of 3 to 5; and Y represents —$SO_3M$, —$SO_4M$, —$SO_3R$, —$SO_4R$, —COOM, —$PO_3M_2$, or —$PO_4M_2$, where M represents H, $NH_4$, or an alkali metal, and R represents a C1-C12 alkyl group.

Examples of the fluoromonomer include fluoroolefins, preferably C2-C10 fluoroolefins; cyclic fluorinated monomers; fluorinated alkyl vinyl ethers represented by the formula $CQ_2=CQOR^1$ or $CQ_2=CQOR^2OR^3$ (wherein Q represents H or F; $R^1$ and $R^3$ represent a C1-C8 alkyl group in which part or all of the hydrogen atoms is/are replaced by fluorine atoms; and $R^2$ is a C1-C8 alkylene group in which part or all of the hydrogen atoms is/are replaced by fluorine atoms); fluoroolefins having a nitrile group; and fluorovinyl ethers having a nitrile group.

More specifically, the fluoromonomer is preferably at least one selected from the group consisting of tetrafluoroethylene (TFE), hexafluoropropylene (HFP), chlorotrifluoroethylene (CTFE), vinyl fluoride, vinylidene fluoride (VDF), trifluoroethylene, hexafluoroisobutylene, monomers represented by the formula $CH_2=CZ^1(CF_2)_nZ^2$ (wherein $Z^1$ represents H or F; $Z^2$ represents H, F, or Cl; and n is an integer of 1 to 10), perfluoro(alkyl vinyl ethers) (PAVE) represented by the formula $CF_2=CF\text{—}ORf^6$ (wherein $Rf^6$ represents a C1-C8 perfluoroalkyl group), alkyl perfluorovinyl ether derivatives represented by the formula $CF_2=CF\text{—}O\text{—}CH_2\text{—}Rf^7$ (wherein $Rf^7$ represents a C1-C5 perfluoroalkyl group), perfluoro-2,2-dimethyl-1,3-dioxole (PDD), and perfluoro-2-methylene-4-methyl-1,3-dioxolane (PMD).

Examples of the monomers represented by the formula $CH_2=CZ^1(CF_2)_nZ^2$ include $CH_2=CFCF_3$, $CH_2=CH\text{—}C_4F_9$, $CH_2=CH\text{—}C_6F_{13}$, and $CH_2=CF\text{—}C_3F_6H$.

Examples of the perfluoro(alkyl vinyl ethers) represented by the formula $CF_2=CF\text{—}ORf^6$ include $CF_2=CF\text{—}OCF_3$, $CF_2=CF\text{—}OCF_2CF_3$, and $CF_2=CF\text{—}OCF_2CF_2CF_3$.

The fluoromonomer may be polymerized together with a fluorine-free monomer. Examples of the fluorine-free monomer include hydrocarbon monomers reactive with the fluoromonomer. Examples of the hydrocarbon monomers include alkenes such as ethylene, propylene, butylene, and isobutylene; alkyl vinyl ethers such as ethyl vinyl ether, propyl vinyl ether, butyl vinyl ether, isobutyl vinyl ether, and cyclohexyl vinyl ether; vinyl esters such as vinyl acetate, vinyl propionate, n-vinyl butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butylbenzoate, vinyl cyclohexanecarboxylate, vinyl monochloroacetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The fluorine-free monomer may be a functional group-containing hydrocarbon monomer. Examples of the functional group-containing hydrocarbon monomer include hydroxyalkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; glycidyl group-containing fluorine-free monomers such as glycidyl vinyl ether and glycidyl allyl ether; amino group-containing fluorine-free monomers such as amino alkyl vinyl ethers and amino alkyl allyl ethers; amide group-containing fluorine-free monomers such as (meth)acrylamide and methylol acrylamide; bromine-containing olefins, iodine-containing olefins, bromine-containing vinyl ethers, and iodine-containing vinyl ethers; and nitrile group-containing fluorine-free monomers.

Polymerization of the above fluoromonomer provides an aqueous dispersion containing at least one fluoropolymer selected from the group consisting of PTFE and melt-processible fluororesins excluding PTFE.

The PTFE may be a PTFE homopolymer or a modified PTFE. The modified PTFE includes a TFE unit and a modified monomer unit based on a modifying monomer copolymerizable with TFE. The PTFE may be a non-melt-processible, fibrillatable high molecular weight PTFE or a melt-processible, non-fibrillatable low molecular weight PTFE.

The modifying monomer may be any monomer copolymerizable with TFE. Examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkylethylenes; ethylene; and nitrile group-containing fluorinated vinyl ethers. These modifying monomers may be used alone or in combination.

Any perfluorovinyl ether may be used, and examples thereof include unsaturated perfluoro compounds represented by the following formula (5):

$$CF_2=CF-ORf^8 \tag{5}$$

wherein $Rf^8$ represents a perfluoro organic group. The term "perfluoro organic group" herein means an organic group in which all the hydrogen atoms bonded with the carbon atoms are replaced by fluorine atoms. The perfluoro organic group may have ether oxygen.

Examples of the perfluorovinyl ethers include perfluoro (alkyl vinyl ethers) (PAVE) represented by the formula (5) wherein $Rf^8$ is a C1-C10 perfluoroalkyl group. The perfluoroalkyl group preferably has 1 to 5 carbon atoms.

The perfluoroalkyl group in the PAVE may be a perfluoromethyl group, a perfluoroethyl group, a perfluoropropyl group, a perfluorobutyl group, a perfluoropentyl group, or a perfluorohexyl group, for example. Preferred is perfluoropropyl vinyl ether (PPVE) in which the perfluoroalkyl group is a perfluoropropyl group.

Examples of the perfluorovinyl ethers further include those represented by the formula (5) wherein $Rf^8$ is a C4-C9 perfluoro(alkoxy alkyl) group; those represented by the formula (5) wherein $Rf^8$ is a group represented by the following formula:

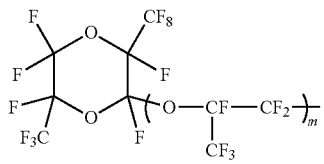

wherein m is 0 or an integer of 1 to 4; and those represented by the formula (5) wherein $Rf^8$ is a group represented by the following formula:

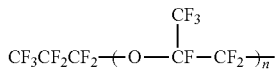

wherein n is an integer of 1 to 4.

Any perfluoroalkylethylenes may be used, and examples thereof include perfluorobutylethylene (PFBE) and perfluorohexylethylene (PFHE).

The nitrile group-containing fluorinated vinyl ether is more preferably a fluorinated vinyl ether represented by the formula $CF_2=CFORf^9CN$ wherein $Rf^9$ represents a C2-C7 alkylene group in which an oxygen atom may optionally be inserted between two carbon atoms.

The modifying monomer in the modified PTFE is preferably at least one selected from the group consisting of HFP, CTFE, VDF, PPVE, PFBE, and ethylene. It is more preferably at least one monomer selected from the group consisting of HFP and CTFE.

The modified PTFE preferably includes 0.001 to 2 mol %, and more preferably not less than 0.001 but less than 1 mol %, of the modifying monomer unit.

The amounts of the respective monomers constituting the PTFE herein can be calculated by appropriate combination of NMR, FT-IR, elemental analysis, and X-ray fluorescence analysis in accordance with the types of the monomers.

The PTFE produced in the production method of the present invention preferably has a melt viscosity (MV) of not lower than $1.0 \times 10$ Pa·S, more preferably not lower than $1.0 \times 10^2$ Pa·S, and still more preferably not lower than $1.0 \times 10^3$ Pa·S.

The melt viscosity can be determined as follows. Specifically, 2 g of a sample is preliminarily heated for five minutes at a measurement temperature (380° C.), and then the value is measured at the maintained temperature with a load of 0.7 MPa using a flow tester (Shimadzu Corp.) and a 2φ-8 L die in conformity with ASTM D1238.

The PTFE produced in the production method of the present invention preferably has a melting point of 324° C. to 360° C.

The melting point herein is a temperature corresponding to the local maximum on a heat-of-fusion curve drawn using a differential scanning calorimeter (DSC) at a temperature-increasing rate of 10° C./min.

The melt-processible fluororesin is preferably at least one fluororesin selected from the group consisting of TFE/PAVE copolymers (PFA), TFE/HFP copolymers (FEP), ethylene (Et)/TFE copolymers (ETFE), Et/TFE/HFP copolymers, polychlorotrifluoroethylene (PCTFE), CTFE/TFE copolymers, Et/CTFE copolymers, and PVF. It is more preferably at least one perfluororesin selected from the group consisting of PFA and FEP.

Any PFA can be used, and it is preferably a copolymer including a TFE unit and a PAVE unit at a TFE/PAVE mole ratio of not lower than 70/30 but lower than 99/1. The mole ratio is more preferably not lower than 70/30 but not higher than 98.9/1.1, and still more preferably not lower than 80/20 but not higher than 98.9/1.1. Too small an amount of the TFE unit tends to cause deteriorated mechanical properties, whereas too large an amount thereof tends to cause so high a melting point that the moldability may deteriorate. The PFA includes 0.1 to 10 mol % of a monomer unit derived from a monomer copolymerizable with TFE and PAVE, and it is also preferably a copolymer including 90 to 99.9 mol % in total of the TFE unit and the PAVE unit. Examples of the monomer copolymerizable with TFE and PAVE include HFP, vinyl monomers represented by the formula $CZ^3Z^4=CZ^5(CF_2)_nZ^6$ (wherein $Z^3$, $Z^4$, and $Z^5$ may be the same as or different from each other, and represent a hydrogen atom or a fluorine atom; $Z^6$ represents a hydrogen atom, a fluorine atom, or a chlorine atom; and n is an integer of 2 to 10), and alkyl perfluorovinyl ether derivatives represented by $CF_2=CF-OCH_2-Rf^7$ (wherein $Rf^7$ represents a C1-C5 perfluoroalkyl group).

The PFA has a lower melting point than the PTFE and it is preferably not lower than 180° C. but lower than 324° C., more preferably 230° C. to 320° C., and still more preferably 280° C. to 320° C.

The PFA preferably has a melt flow rate (MFR) of 1 to 500 g/10 min.

The MFR herein is a value determined by the method in conformity with ASTM D1238. It is determined at a measurement temperature and a load each depending on the type of the fluoropolymer (for example, the temperature is set at 372° C. for PFA and FEP and 297° C. for ETFE, and the load is set at 5 kg for PFA, FEP, and ETFE).

Any FEP can be used, and it is preferably a copolymer including a TFE unit and a HFP unit at a TFE/HFP mole ratio of not lower than 70/30 but lower than 99/1. The mole ratio is more preferably not lower than 70/30 but not higher than 98.9/1.1, and still more preferably not lower than 80/20 but not higher than 98.9/1.1. Too small an amount of the TFE unit tends to cause deteriorated mechanical properties, whereas too large an amount thereof tends to cause so high a melting point that the moldability tends to deteriorate. The FEP is also preferably a copolymer including 0.1 to 10 mol % of a monomer unit derived from a monomer copolymerizable with TFE and HFP and 90 to 99.9 mol % of the TFE unit and the HFP unit. Examples of the monomer copolymerizable with TFE and HFP include PAVE and alkyl perfluorovinyl ether derivatives.

The FEP has a lower melting point than the PTFE, and it is preferably not lower than 150° C. but lower than 324° C., more preferably 200° C. to 320° C., and still more preferably 240° C. to 320° C.

The FEP preferably has a MFR of 1 to 500 g/10 min.

The ETFE is preferably a copolymer including a TFE unit and an ethylene unit at a TFE/ethylene mole ratio of not lower than 20/80 but not higher than 90/10. The mole ratio is more preferably not lower than 37/63 but not higher than 85/15, and still more preferably not lower than 38/62 but not higher than 80/20. The ETFE may be a copolymer including TFE, ethylene, and a monomer copolymerizable with TFE and ethylene. Examples of the copolymerizable monomer include monomers represented by the formulas $CH_2=CX^5Rf^3$, $CF_2=CFRf^3$, $CF_2=CFORf^3$, and $CH_2=C(Rf^3)_2$ wherein $X^5$ represents a hydrogen atom or a fluorine atom; and $Rf^3$ represents a fluoroalkyl group optionally having an ether bond. Preferred among these are fluorovinyl monomers represented by the formulas $CF_2=CFRf^3$ and $CF_2=CFORf^3$, and $CH_2=CX^5Rf^3$. More preferred are HFP, perfluoro(alkyl vinyl ethers) represented by the formula $CF_2=CF-ORf^4$ (wherein $Rf^4$ represents a C1-C5 perfluoroalkyl group), and fluorovinyl monomers represented by the formula $CH_2=CX^5Rf^3$ (wherein $Rf^3$ represents a C1-C8 fluoroalkyl group). The monomer copolymerizable with TFE and ethylene may also be an unsaturated aliphatic carboxylic acid such as itaconic acid or itaconic anhydride. The amount of the monomer copolymerizable with TFE and ethylene is preferably 0.1 to 10 mol %, more preferably 0.1 to 5 mol %, and particularly preferably 0.2 to 4 mol %, based on the amount of the fluoropolymer.

The ETFE has a lower melting point than the PTFE, and it is preferably not lower than 140° C. but lower than 324° C., more preferably 160° C. to 320° C., and still more preferably 195° C. to 320° C.

The ETFE preferably has a MFR of 1 to 500 g/10 min.

The amounts of the respective monomer units in the aforementioned copolymer can be calculated by appropriate combination of NMR, FT-IR, elemental analysis, and X-ray fluorescence analysis in accordance with the types of the monomers.

The fluoropolymer is preferably in the form of particles having a volume average particle size of not smaller than 0.1 nm but smaller than 20 nm. The particles having a volume average particle size within the above range is significantly finely dispersible in a matrix material, exerting the effects of further improving the smoothness and the texture of the coating surface. Use of the fluoropolymer particles having a volume average particle size within the above range in multistage polymerization can provide an aqueous dispersion which contains fluororesin particles having a significantly small particle size. The particles having too large a volume average particle size lead to an aqueous dispersion which contains fluororesin particles having a significantly large particle size. Thus, the reaction stability may be poor and unexpected coagulum may be generated during the polymerization. Use of fluoropolymer particles having too large a volume average particle size in multistage polymerization fails to provide an aqueous dispersion which contains fluororesin particles having a significantly small particle size and which is excellent in dispersion stability. Fluoropolymer particles having a volume average particle size of smaller than 0.1 nm are not easy to produce. The volume average particle size of the fluoropolymer particles is more preferably not smaller than 0.5 nm, and particularly preferably not smaller than 1.0 nm, whereas the particle size is preferably not greater than 15 nm, more preferably not greater than 10 nm, and particularly preferably not greater than 5 nm.

The volume average particle size is determined by dynamic light scattering. In the determination, a fluoropolymer aqueous dispersion with a fluoropolymer solids content of 1.0% by mass is prepared. The value is determined using ELSZ-1000S (Otsuka Electronics Co., Ltd.) at 25° C. with 70 accumulations. The applied refractive index of the solvent (water) is 1.3328 and the viscosity of the solvent (water) is 0.8878 mPa·s. The volume average particle size is the average particle size of the particles dispersed in the state of primary particles.

The fluoropolymer is preferably not a fluorinated ionomer because it is difficult to apply a fluorinated ionomer to the use of the fluoropolymer aqueous dispersion to be mentioned later.

The fluoropolymer preferably has an equivalent weight (EW) of not less than 6,000. The equivalent weight (EW) is a dry weight per equivalent of an ion-exchange group. A high equivalent weight (EW) of the fluoropolymer indicates that the monomers constituting the fluoropolymer hardly include an ionomer. Even though the fluoropolymer hardly includes an ionomer, they have a significantly small volume average particle size. The equivalent weight (EW) is more preferably not less than 10,000. The EW may have any upper limit, and it is preferably not more than 50,000,000.

The method of producing an aqueous dispersion of fluoropolymer particles disclosed in Patent Literature 3 essentially includes forming dispersed particles of a fluorinated ionomer in the first stage. Thus, the finally produced fluoropolymer has poor heat resistance, and bubbles may be generated and staining may occur when the resulting fluoropolymer is heated. In the production method of the present invention, the equivalent weight (EW) of the resulting fluoropolymer is not less than 6,000. Thus, the resulting fluoropolymer has excellent heat resistance.

The equivalent weight can be determined as follows.

Hydrochloric acid or nitric acid is added to an aqueous dispersion containing a fluoropolymer so as to coagulate the fluoropolymer. The coagulated fluoropolymer is washed with pure water until the solution after the washing becomes neutral, and then heat dried in vacuo at 110° C. or lower until the moisture is removed. Then, 0.3 g of the dried fluoropolymer is immersed in 30 mL of a saturated NaCl aqueous solution at 25° C. and left to stand under stirring for 30 minutes. Next, the protons in the saturated NaCl aqueous solution are subjected to neutralization titration using a 0.01 N solution of sodium hydroxide in water with a phenolphthalein indicator. The neutralization provides a fluoropolymer including a sodium ion as the counterion for the ion-exchange group. This fluoropolymer is rinsed with pure water, and then vacuum-dried and weighed. The equivalent weight EW (g/eq) is then determined by the following formula:

$$EW=(W/M)-22$$

wherein M (mmol) represents the amount of the sodium hydroxide used for neutralization and W (mg) represents the mass of the fluoropolymer including a sodium ion as the counterion for the ion-exchange group.

The polymerization initiator may be any initiator capable of generating radicals within the above range of the polymerization temperature, and any known oil-soluble and/or water-soluble polymerization initiators can be used. Further, the initiator may be combined with a reducing agent to form a redox agent, for example, and then starts the polymerization. The concentration of the polymerization initiator can appropriately be determined in accordance with the types of the monomers, the target molecular weight of a polymer, and the reaction rate.

The polymerization initiator is preferably at least one selected from the group consisting of persulfates and organic peroxides. In order to achieve good dispersion stability of the fluoropolymer particles in the aqueous dispersion, the polymerization initiator may be any of persulfates such as ammonium persulfate and potassium persulfate and water-soluble organic peroxides such as disuccinic acid peroxide and diglutamic acid peroxide.

In order to achieve good dispersion stability of fluoropolymer particles in the aqueous dispersion, the polymerization initiator is preferably used in an amount corresponding to 2 ppm or more of the aqueous medium.

The aqueous medium is a reaction medium where the polymerization proceeds, and is a liquid that contains water. The aqueous medium may be any medium that contains water, and it may be one containing water and, for example, any of fluorine-free organic solvents such as alcohols, ethers, and ketones, and/or fluorinated organic solvents having a boiling point of 40° C. or lower.

The polymerization in the production method of the present invention can be performed in the presence of a chain-transfer agent. The chain-transfer agent may be a known one. Examples thereof include saturated hydrocarbons such as methane, ethane, propane, and butane; halogenated hydrocarbons such as chloromethane, dichloromethane, and difluoroethane; alcohols such as methanol and ethanol; and hydrogen. The chain-transfer agent is preferably one which is in the gas state at room temperature and atmospheric pressure, and more preferably ethane or propane.

The amount of the chain-transfer agent is usually 1 to 50,000 ppm, and preferably 1 to 20,000 ppm, based on the sum of the amounts of the fluoromonomers supplied.

The chain-transfer agent may be added to a reactor at one time before the start of the polymerization, may be added in portions during the polymerization, or may continually be added during the polymerization.

The polymerization is preferably performed at 10° C. to 95° C., and more preferably not lower than 30° C. but not higher than 90° C.

The polymerization is preferably performed at 0.05 to 3.9 MPaG, and more preferably not lower than 0.1 MPaG but not higher than 3.0 MPaG.

The polymerization is performed as follows. Specifically, TFE and optionally a modifying monomer are put into a polymerization reactor. The contents of the reactor are stirred and the temperature in the reactor is maintained at a predetermined polymerization temperature. A polymerization initiator is added to the reactor to initiate the polymerization reaction. If necessary, components such as an aqueous medium and additives may be put into the reactor before the start of the polymerization reaction. After the start of the polymerization reaction, the TFE, the modifying monomer, the polymerization initiator, and the chain-transfer agent can additionally be added in accordance with the respective purposes.

The polymerization can provide an aqueous dispersion containing fluoropolymer particles. The resulting aqueous dispersion has a solids content of about 1 to 40% by mass, and preferably 5 to 30% by mass. The solids content herein is determined as follows. Specifically, 1 g of the aqueous dispersion is dried in a forced air oven at 150° C. for 60 minutes, and the ratio (in terms of percentage) of the mass of residue after heating to the mass (1 g) of the aqueous dispersion is defined as the solids content.

For the fluoropolymer aqueous dispersion of the present invention containing fluoropolymer particles at a solids content of 5.0% by mass, the sediment amount of the fluoropolymer particles is preferably not more than 10.0% by mass, more preferably not more than 7.0% by mass, still more preferably not more than 5.5% by mass, and particularly preferably not more than 3.0% by mass. The lower limit thereof is not particularly limited.

The "sediment amount of the fluoropolymer particles" herein can be measured as follows, for example. First, 30 g of a fluoropolymer aqueous dispersion maintained at 25° C. is put in a container for exclusive use, and then stirred at 5000 rpm for five minutes using a centrifuge (himac CT15D, Hitachi Koki Co., Ltd.) equipped with a rotor (type RT15A7), separating the sediment layer and the fluoropolymer aqueous dispersion layer. The fluoropolymer aqueous dispersion layer is isolated and the solids content is determined. The sediment amount is calculated from the difference between the solids content in the fluoropolymer aqueous dispersion layer and the original solids content in the fluoropolymer aqueous dispersion used. The sediment amount is determined in terms of a proportion (% by mass) in the fluoropolymer contained in the fluoropolymer aqueous dispersion. The lower the proportion is, the better the storage stability is.

For the fluoropolymer aqueous dispersion of the present invention containing fluoropolymer particles at a solids content of 5.0% by mass, the mesh-up amount of the fluoropolymer particles is preferably not more than 2.5% by mass, more preferably not more than 2.0% by mass, still more preferably not more than 1.8% by mass, and particularly preferably not more than 1.3% by mass. The lower limit is not particularly limited.

The "mesh-up amount of the fluoropolymer particles" herein can be determined as follows, for example. First, 100 g of a fluoropolymer aqueous dispersion maintained at 65° C. is circulated at a discharge flow rate of 10 L/h for two hours using a peristaltic pump (roller pump RP-2000, TOKYO RIKAKIKAI CO, LTD.) equipped with a tube (Tygon tube) having an inner diameter of 4.76 mm and an outer diameter of 7.94 mm. Then, the aqueous dispersion is filtered through a 200-mesh SUS net. The amount of the substance remaining on the net is measured in terms of a proportion (% by mass) in the fluoropolymer contained in the fluoropolymer aqueous dispersion. The lower the proportion is, the better the mechanical stability is.

The polymerization in the production method of the present invention is preferably performed in the absence of a fluorinated compound represented by the following formula (2):

$$X-(CF_2)_{m2}-Y \quad (2)$$

wherein X represents H or F; m2 is an integer of 6 or greater; and Y represents —SO$_3$M, —SO$_4$M, —SO$_3$R, —SO$_4$R, —COOM, —PO$_3$M$_2$, or —PO$_4$M$_2$, where M represents H, NH$_4$, or an alkali metal, and R represents a C1-C12 alkyl group. The production method of the present invention can provide an aqueous dispersion containing fluoropolymer particles having a sufficiently small volume average particle size without such a conventional long-chain fluorosurfactant.

The polymerization in the production method of the present invention is preferably emulsion polymerization. The polymerization in the production method of the present invention is preferably radical polymerization.

The fluoropolymer aqueous dispersion produced by the production method of the present invention may be subjected to multistage polymerization. Since the fluoropolymer aqueous dispersion produced by the production method of the present invention contains fluoropolymer particles having a significantly small particle size, such multistage polymerization can provide an aqueous dispersion which contains fluororesin particles each of which has a core-shell structure whose core portion comprises the fluoropolymer particle and which have a significantly small particle size.

Further, fluoropolymer fine powder can also be produced by coagulating the fluoropolymer aqueous dispersion produced by the production method of the present invention, washing the resulting coagulated particles, and drying the washed particles.

The above coagulation, washing, and drying can be performed by conventionally known methods.

Further, the production method may include step (I) of bringing the fluoropolymer aqueous dispersion produced by the production method of the present invention into contact with an anion exchange resin in the presence of a nonionic surfactant, and step (II) of condensing the aqueous dispersion produced in step (I) such that the solids content in the aqueous dispersion is adjusted to 30 to 70% by mass based on 100% by mass of the aqueous dispersion. Such a method can provide a fluoropolymer aqueous dispersion free from a fluorosurfactant and having a high solids content.

The solids content of the condensed fluoropolymer aqueous dispersion is determined as follows. Specifically, 1 g of the aqueous dispersion is dried in a forced air oven at 380° C. for 60 minutes, and the ratio (in terms of percentage) of the mass of residue after heating to the mass (1 g) of the aqueous dispersion is defined as the solids content.

The aqueous dispersion can be brought into contact with an anion exchange resin by a conventionally known method. The aqueous dispersion can be condensed by the aforementioned method, for example.

The production method of the present invention preferably further includes a step of separating and collecting the fluoropolymer aqueous dispersion from the anion exchange resin after step (I).

The nonionic surfactant can be any known fluorine-free nonionic compound. Examples of the nonionic surfactant include: ether-type nonionic surfactants such as polyoxyethylene alkyl phenyl ethers, polyoxyethylene alkyl ethers, and polyoxyethylene alkylene alkyl ethers; polyoxyethylene derivatives such as ethylene oxide/propylene oxide block copolymers; ester-type nonionic surfactants such as sorbitan fatty acid esters, polyoxyethylene sorbitan fatty acid esters, polyoxyethylene sorbitol fatty acid esters, glycerin fatty acid esters, and polyoxyethylene fatty acid esters; and amine-type nonionic surfactants such as polyoxyethylene alkylamines and alkyl alkanolamides. These surfactants are non-fluorinated nonionic surfactants.

The hydrophobic group in the compound constituting the nonionic surfactant can be any of alkyl phenol groups, linear alkyl groups, and branched alkyl groups. It is preferably a compound free from a benzene ring, such as a compound having no alkyl phenol group in the structure.

The nonionic surfactant is particularly preferably a polyoxyethylene alkyl ether. The polyoxyethylene alkyl ether is preferably one comprising a polyoxyethylene alkyl ether structure having a C10-C20 alkyl group, and more preferably one comprising a polyoxyethylene alkyl ether structure having a C10-C15 alkyl group. The alkyl group in the polyoxyethylene alkyl ether structure preferably has a branched structure.

Examples of commercially available products of the polyoxyethylene alkyl ethers include Genapol X080 (trade name, Clariant), TERGITOL 9-S-15 (trade name, Clariant), NOIGEN TDS-80 (trade name, DKS Co., Ltd.), and LEOCOL TD-90 (trade name, Lion Corp.).

The fluoropolymer aqueous dispersion produced by the production method of the present invention and the fluoropolymer fine powder can suitably be used as, for example, additives for modifying molding material, ink, cosmetics, coating material, grease, parts of office automation devices, and toners; and additives for plating solutions. Examples of the molding material include engineering plastics such as polyoxybenzoyl polyester, polyimide, polyamide, polyamide-imide, polyacetal, polycarbonate, and polyphenylene sulfide.

The fluoropolymer aqueous dispersion produced by the production method of the present invention and the fluoropolymer fine powder can suitably be used as additives for molding material for the purposes of, for example, improving non-stickiness and sliding properties of rollers for copying devices; improving the texture of engineering plastic molded products, such as surface sheets of furniture, dashboard of automobiles, and covers of consumer electrical appliances; and improving the smoothness and abrasion resistance of machine parts that generate mechanical friction, such as light-load bearings, gears, cams, buttons of touch-tone phones, movie projectors, camera parts, and sliding parts. Also, they can suitably be used as processing aids for engineering plastics.

The fluoropolymer aqueous dispersion produced by the production method of the present invention and the fluoropolymer fine powder can be used as additives for coating material for the purpose of improving the smoothness of varnish and paint. The fluoropolymer aqueous dispersion of the present invention and the fluoropolymer fine powder can be used as additives for cosmetics for the purpose of, for example, improving the smoothness of cosmetics such as foundation.

The fluoropolymer aqueous dispersion produced by the production method of the present invention and the fluoropolymer fine powder can also be suitably used for improving the oil or water repellency of articles such as wax and for improving the smoothness of grease and toners.

The fluoropolymer aqueous dispersion produced by the production method of the present invention and the fluoropolymer fine powder can also be used as electrode binders for secondary batteries and fuel cells, hardness adjusters for electrode binders, water-repellents for electrode surfaces, and the like. The fluoropolymer aqueous dispersion is more suitable for this use than the fluoropolymer fine powder, in many cases.

EXAMPLES

Next, the present invention is described below referring to, but not limited to, examples.

The values in the examples are determined as follows.
(Volume Average Particle Size)

The volume average particle size is measured by dynamic light scattering. A fluoropolymer aqueous dispersion having a fluoropolymer solids content of 1.0% by mass was prepared. The value was determined using ELSZ-1000S (Otsuka Electronics Co., Ltd.) at 25° C. with 70 accumulations. The applied refractive index of the solvent (water) was 1.3328 and the viscosity of the solvent (water) was 0.8878 mPa·s.
(Melt Viscosity (MV))

The melt viscosity was determined as follows. Specifically, 2 g of a sample was preliminarily heated for five minutes at a measurement temperature (380° C.), and then the value was measured at the maintained temperature with a load of 0.7 MPa using a flow tester (Shimadzu Corp.) and a 2ϕ-8 L die in conformity with ASTM D1238.
(Modified Amount)

The modified amount was determined by appropriate combination of NMR, FT-IR, elemental analysis, and X-ray fluorescence analysis in accordance with the types of monomers.
(Melting Point)

The melting point was determined as a temperature corresponding to the local maximum on a heat-of-fusion curve drawn using a differential scanning calorimeter (DSC) at a temperature-increasing rate of 10° C./min.
(Solids Content)

The solids content of the pre-condensation aqueous dispersion obtained by polymerization was a value corresponding to the ratio (in terms of percentage) of the mass of residue after heating (which was prepared by drying 1 g of the aqueous dispersion in a forced air oven at 150° C. for 60 minutes) to the mass (1 g) of the aqueous dispersion.

The solids content of the condensed fluoropolymer aqueous dispersion was a value corresponding to the ratio (in terms of percentage) of the mass of residue after heating (which was prepared by drying 1 g of the aqueous dispersion in a forced air oven at 380° C. for 60 minutes) to the mass (1 g) of the aqueous dispersion.
(Melt Flow Rate (MFR))

The MFR was determined by the method in conformity with ASTM D1238 at a predetermined measurement temperature and load depending on the type of the fluoropolymer (for example, the temperature was 372° C. for PFA and FEP and 297° C. for ETFE, and the load was 5 kg for PFA, FEP, and ETFE).
(Evaluation of Dispersion Stability)
(Storage Stability Test)

First, 30 g of the fluoropolymer aqueous dispersion maintained at 25° C. was put in a container for exclusive use, and then stirred using a centrifuge (himac CT15D, Hitachi Koki Co., Ltd.) equipped with a rotor (type RT15A7) at 5000 rpm for five minutes, separating the sediment layer and the fluoropolymer aqueous dispersion layer. The fluoropolymer aqueous dispersion layer was isolated and the solids content was determined. The sediment amount was calculated from the difference between the solids content in the fluoropolymer aqueous dispersion layer and the original solids content in the fluoropolymer aqueous dispersion used. The sediment amount was measured as a proportion (% by mass) in the fluoropolymer contained in the fluoropolymer aqueous dispersion used. The lower the proportion is, the better the storage stability is.
(Mechanical Stability Test)

First, 100 g of the fluoropolymer aqueous dispersion maintained at 65° C. was circulated at a discharge flow rate of 10 L/h for two hours using a peristaltic pump (roller pump RP-2000, TOKYO RIKAKIKAI CO, LTD.) equipped with a tube (Tygon tube) having an inner diameter of 4.76 mm and an outer diameter of 7.94 mm. Then, the fluoropolymer aqueous dispersion was filtered through a 200-mesh SUS net. The mesh-up amount was measured as a proportion (% by mass) in the fluoropolymer contained in the fluoropolymer aqueous dispersion used. The lower the proportion is, the better the mechanical stability is.

Example 1

A 1-L glass reactor equipped with a stirrer was charged with 530 g of deionized water, 30 g of paraffin wax, and 55.0 g of an ammonium perfluorohexanoate (APFH) dispersant. Next, the contents of the reactor were heated up to 85° C. and sucked, and simultaneously the reactor was purged with a TFE monomer, thereby removing the oxygen in the reactor. Then, 0.03 g of ethane gas was added to the reactor, and the contents were stirred at 540 rpm. The TFE monomer was added to the reactor until the inner pressure reached 0.73 MPaG. An initiator prepared by dissolving 0.11 g of ammonium persulfate (APS) in 20 g of deionized water was charged into the reactor, and the pressure in the reactor was adjusted to 0.83 MPaG. The charging of the initiator was followed by a decrease in the pressure, which means that the start of the polymerization was observed. The TFE monomer was added to the reactor to keep the pressure, and the polymerization was continued until about 140 g of the TFE monomer was consumed in the reaction. Thereafter, the air in the reactor was discharged until the pressure reached normal pressure. The contents were then taken out of the reactor and cooled down. Supernatant paraffin wax was removed from the resulting PTFE aqueous dispersion.

The resulting PTFE aqueous dispersion had a solids content of 20.5% by mass and a volume average particle size of 0.9 nm.

A portion of the PTFE aqueous dispersion was frozen in a freezer. The frozen portion of the PTFE aqueous dispersion was left to stand until the temperature reached 25° C., and thereby a coagulated powder was obtained. The wet coagulated powder was dried at 150° C. for 18 hours. The PTFE powder at this time had a melt viscosity of $3.0 \times 10^3$ Pa·S and a melting point of 327.0° C.

Deionized water was added to the PTFE aqueous dispersion to adjust the solids content to 5.0% by mass, and the storage stability thereof was evaluated. The sediment amount was 0.1% by mass.

APFH, which is the same dispersant as used in the polymerization, was added to the PTFE aqueous dispersion to adjust the amount of the dispersant to 10.0% by mass. Deionized water was further added to the dispersion to adjust the solids content to 5.0% by mass, and the mechanical stability was evaluated. The mesh-up amount was 0.1% by mass.

Then, 100 g of the resulting PTFE aqueous dispersion was uniformly mixed with 2.0 g of a surfactant (NOIGEN TDS-80, DKS Co., Ltd.), and the mixture was passed through a column filled with an anion exchange resin (trade name: AMBERLITE IRA900J, Rohm and Haas). The resulting aqueous dispersion was maintained at 60° C., and the condensed phase provided by phase separation was collected. This condensed phase had a solids content of 63% by mass. Water and a surfactant were further added to the condensed phase to give a solids content of 60% by mass and a surfactant content of 8% by mass, and the pH was adjusted to 9.6 with ammonia water.

Example 2

The polymerization was performed in the same manner as in Example 1 except that the polymerization temperature was not 85° C. as in Example 1 but 70° C.

Example 3

The polymerization was performed in the same manner as in Example 1 except that the amount of the ammonium persulfate (APS) initiator was not 0.11 g as in Example 1 but 0.006 g.

Example 4

The polymerization was performed in the same manner as in Example 1 except that the amount of the ammonium persulfate (APS) initiator was not 0.11 g as in Example 1 but 0.003 g.

Example 5

The polymerization was performed in the same manner as in Example 1 except that the amount of the ammonium persulfate (APS) initiator was not 0.11 g as in Example 1 but 0.028 g.

Example 6

The polymerization was performed in the same manner as in Example 1 except that the amount of the ammonium persulfate (APS) initiator was not 0.11 g as in Example 1 but 0.006 g and the polymerization was continued until about 185 g of the TFE monomer was consumed in the reaction.

Example 7

The polymerization was performed in the same manner as in Example 1 except that the amount of the ammonium persulfate (APS) initiator was not 0.11 g as in Example 1 but 0.006 g, the amount of the ammonium perfluorohexanoate (APFH) dispersant was not 55.0 g but 26.4 g, and the polymerization was continued until about 10 g of the TFE monomer was consumed in the reaction.

Example 8

The polymerization was performed in the same manner as in Example 1 except that the amount of the ammonium persulfate (APS) initiator was not 0.11 g as in Example 1 but 0.006 g, the amount of the ethane gas was not 0.03 g but 0.01 g, the maintained pressure in the reactor was not 0.83 MPaG but 0.20 MPaG, and the polymerization was continued until about 40 g of the TFE monomer was consumed in the reaction.

Example 9

The polymerization was performed in the same manner as in Example 1 except that the amount of the ammonium persulfate (APS) initiator was not 0.11 g as in Example 1 but 0.006 g, 55.0 g of the ammonium perfluorohexanoate (APFH) dispersant was replaced by 22.0 g of an ammonium 2,3,3,3-tetrafluoro-2-[1,1,2,3,3,3-hexafluoro-2-(trifluoromethoxy)propoxy]-propanoate $(CF_3OCF(CF_3)CF_2OCF(CF_3)COONH_4)$ (PMPA) dispersant, and the polymerization was continued until about 40 g of the TFE monomer was consumed in the reaction.

Example 10

The polymerization was performed in the same manner as in Example 9 except that the amount of the ammonium 2,3,3,3-tetrafluoro-2-[1,1,2,3,3,3-hexafluoro-2-(trifluoromethoxy)propoxy]-propanoate $(CF_3OCF(CF_3)CF_2OCF(CF_3)COONH_4)$ (PMPA) dispersant was not 22.0 g as in Example 9 but 16.5 g.

Example 11

The polymerization was performed in the same manner as in Example 9 except that the amount of the ammonium 2,3,3,3-tetrafluoro-2-[1,1,2,3,3,3-hexafluoro-2-(trifluoromethoxy)propoxy]-propanoate $(CF_3OCF(CF_3)CF_2OCF(CF_3)COONH_4)$ (PMPA) dispersant was not 22.0 g as in Example 9 but 11.0 g.

Example 12

The polymerization was performed in the same manner as in Example 9 except that the amount of the ammonium 2,3,3,3-tetrafluoro-2-[1,1,2,3,3,3-hexafluoro-2-(trifluoromethoxy)propoxy]-propanoate $(CF_3OCF(CF_3)CF_2OCF(CF_3)COONH_4)$ (PMPA) dispersant was not 22.0 g as in Example 9 but 9.9 g.

Example 13

The polymerization was performed in the same manner as in Example 9 except that 22.0 g of the ammonium 2,3,3,3-tetrafluoro-2-[1,1,2,3,3,3-hexafluoro-2-(trifluoromethoxy)propoxy]-propanoate $(CF_3OCF(CF_3)CF_2OCF(CF_3)COONH_4)$ (PMRA) dispersant as in Example 9 was replaced by 110.0 g of an ammonium perfluoropentanoate dispersant (APFP), and the polymerization was continued until about 140 g of the TFE monomer was consumed in the reaction.

Example 14

A 1-L glass reactor equipped with a stirrer was charged with 530 g of deionized water, 30 g of paraffin wax, and 55.0 g of an ammonium perfluorohexanoate (APFH) dispersant. Next, the contents of the reactor were heated up to 85° C. and sucked, and simultaneously the reactor was purged with a TFE monomer, thereby removing the oxygen in the reactor. Then, 0.03 g of ethane gas and 1.12 g of perfluoro [3-(1-methyl-2-vinyloxy-ethoxy)propionitrile] (hereinafter, abbreviated as CNVE) were added to the reactor, and the contents were stirred at 540 rpm. The TFE monomer was added to the reactor until the inner pressure reached 0.73 MPaG. An initiator prepared by dissolving 0.11 g of ammonium persulfate (APS) in 20 g of deionized water was charged into the reactor, and the pressure in the reactor was adjusted to 0.83 MPaG. The charging of the initiator was followed by a decrease in the pressure, which means that the start of the polymerization was observed. The TFE monomer was added to the reactor to keep the pressure, and the polymerization was continued until about 140 g of the TFE monomer was consumed in the reaction. Thereafter, the air in the reactor was discharged until the pressure reached normal pressure. The contents were then taken out of the reactor and cooled down. Supernatant paraffin wax was removed from the resulting PTFE aqueous dispersion.

The resulting PTFE aqueous dispersion had a solids content of 19.9% by mass and a volume average particle size of 1.3 nm.

The PTFE aqueous dispersion was frozen in a freezer. The frozen PTFE aqueous dispersion was left to stand until the temperature reached 25° C., and thereby a coagulated powder was obtained. The wet coagulated powder was vacuum dried at 70° C. for 50 hours. The PTFE powder at this time was hardly in flux even under heating, so that the melt viscosity thereof was impossible to measure. The melting point thereof was 327.0° C. and the CNVE modifying amount thereof was 0.20 mol %.

Example 15

The polymerization was performed in the same manner as in Example 14 except that 0.03 g of the ethane gas as in Example 14 was not added.

Example 16

The polymerization was performed in the same manner as in Example 14 except that the polymerization temperature was not 85° C. as in Example 14 but 70° C.

Example 17

The polymerization was performed in the same manner as in Example 14 except that the amount of the ammonium persulfate (APS) initiator was not 0.11 g as in Example 14 but 0.006 g and 1.12 g of the CNVE was replaced by 0.20 g of 3,3,4,4,5,5,6,6,7,7,8,8,8-tridecafluorooct-1-ene (PFHE).

Example 18

The polymerization was performed in the same manner as in Example 14 except that the amount of the ammonium persulfate (APS) initiator was not 0.11 g as in Example 14 but 0.006 g, 1.12 g of the CNVE was replaced by 0.20 g of HFP, and 0.03 g of the ethane gas was not added.

Example 19

The polymerization was performed in the same manner as in Example 14 except that the amount of the ammonium persulfate (APS) initiator was not 0.11 g as in Example 14 but 0.006 g, 1.12 g of the CNVE was replaced by 0.12 g of PMVE, 0.03 g of the ethane gas was not added, and the polymerization was continued until about 40 g of the TFE monomer was consumed in the reaction.

Example 20

The polymerization was performed in the same manner as in Example 19 except that 0.12 g of the PMVE as in Example 19 was replaced by 0.46 g of PPVE.

Example 21

The polymerization was performed in the same manner as in Example 19 except that 0.12 g of the PMVE as in Example 19 was replaced by 0.18 g of CTFE.

Example 22

The polymerization was performed in the same manner as in Example 19 except that the amount of the PMVE was not 0.12 g as in Example 19 but 0.01 g and the maintained pressure in the reactor was not 0.83 MPaG but 0.20 MPaG.

Example 23

The polymerization was performed in the same manner as in Example 16 except that 55.0 g of the ammonium perfluorohexanoate (APFH) dispersant as in Example 16 was replaced by 27.5 g of an ammonium 2,3,3,3-tetrafluoro-2-[1,1,2,3,3,3-hexafluoro-2-(trifluoromethoxy)propoxy]-propanoate $(CF_3OCF(CF_3)CF_2OCF(CF_3)COONH_4)$ (PMPA) dispersant.

Example 24

The polymerization was performed in the same manner as in Example 14 except that 1.12 g of the CNVE as in Example 14 was replaced by 8.80 g of PPVE and the polymerization was continued until about 120 g of the TFE monomer was consumed in the reaction.

The resulting PFA aqueous dispersion had a solids content of 18.5% by mass and a volume average particle size of 6.0 nm.

A portion of the PFA aqueous dispersion was frozen in a freezer. The frozen portion of the PFA aqueous dispersion was left to stand until the temperature reached 25° C., and thereby coagulated powder was obtained. The wet coagulated powder was dried at 150° C. for 18 hours. The PFA powder at this time had a melt flow rate of 230 g/10 min, a melting point of 319.7° C., and a PPVE modifying amount of 1.49 mol %.

Example 25

The polymerization was performed in the same manner as in Example 24 except that the amount of the PPVE was not 8.80 g as in Example 24 but 5.90 g and the amount of the ethane gas was not 0.03 g but 0.02 g.

Comparative Example 1

The polymerization was performed in the same manner as in Example 9 except that the amount of the ammonium 2,3,3,3-tetrafluoro-2-[1,1,2,3,3,3-hexafluoro-2-(trifluoromethoxy)propoxy]-propanoate $(CF_3OCF(CF_3)CF_2OCF(CF_3)COONH_4)$ (PMPA) dispersant was not 22.0 g as in Example 9 but 8.3 g.

The resulting PTFE aqueous dispersion had a solids content of 7.1% by mass and a volume average particle size of 121.6 nm.

The dispersion stability of the resulting PTFE aqueous dispersion was evaluated, resulting in poor mechanical stability and poor storage stability. Thus, the dispersion stability was insufficient.

Tables 1 and 2 show the polymerization conditions and the evaluation results on the fluoropolymer aqueous dispersions in the respective examples.

TABLE 1

|  | Temperature °C. | Pressure MPaG | Initiator Type | Initiator Amount g | Emulsifying agent Type | Emulsifying agent Amount g | Modifying agent Type | Modifying agent Amount g | Chain-transfer agent Type | Chain-transfer agent Amount g |
|---|---|---|---|---|---|---|---|---|---|---|
| Example 1 | 85 | 0.83 | APS | 0.110 | APFH | 55.0 | — | — | Ethane | 0.03 |
| Example 2 | 70 | 0.83 | APS | 0.110 | APFH | 55.0 | — | — | Ethane | 0.03 |
| Example 3 | 85 | 0.83 | APS | 0.006 | APFH | 55.0 | — | — | Ethane | 0.03 |
| Example 4 | 85 | 0.83 | APS | 0.003 | APFH | 55.0 | — | — | Ethane | 0.03 |
| Example 5 | 85 | 0.83 | APS | 0.028 | APFH | 55.0 | — | — | Ethane | 0.03 |
| Example 6 | 85 | 0.83 | APS | 0.006 | APFH | 55.0 | — | — | Ethane | 0.03 |
| Example 7 | 85 | 0.83 | APS | 0.006 | APFH | 26.4 | — | — | Ethane | 0.03 |
| Example 8 | 85 | 0.20 | APS | 0.006 | APFH | 55.0 | — | — | Ethane | 0.01 |
| Example 9 | 85 | 0.83 | APS | 0.006 | PMPA | 22.0 | — | — | Ethane | 0.03 |
| Example 10 | 85 | 0.83 | APS | 0.006 | PMPA | 16.5 | — | — | Ethane | 0.03 |
| Example 11 | 85 | 0.83 | APS | 0.006 | PMPA | 11.0 | — | — | Ethane | 0.03 |
| Example 12 | 85 | 0.83 | APS | 0.006 | PMPA | 9.9 | — | — | Ethane | 0.03 |
| Example 13 | 85 | 0.83 | APS | 0.006 | APFP | 110.0 | — | — | Ethane | 0.03 |
| Example 14 | 85 | 0.83 | APS | 0.110 | APFH | 55.0 | CNVE | 1.12 | Ethane | 0.03 |
| Example 15 | 85 | 0.83 | APS | 0.110 | APFH | 55.0 | CNVE | 1.12 | — | — |
| Example 16 | 70 | 0.83 | APS | 0.110 | APFH | 55.0 | CNVE | 1.12 | Ethane | 0.03 |
| Example 17 | 85 | 0.83 | APS | 0.006 | APFH | 55.0 | PFHE | 0.20 | Ethane | 0.03 |
| Example 18 | 85 | 0.83 | APS | 0.006 | APFH | 55.0 | HFP | 0.20 | — | — |
| Example 19 | 85 | 0.83 | APS | 0.006 | APFH | 55.0 | PMVE | 0.12 | — | — |
| Example 20 | 85 | 0.83 | APS | 0.006 | APFH | 55.0 | PPVE | 0.46 | — | — |
| Example 21 | 85 | 0.83 | APS | 0.006 | APFH | 55.0 | CTFE | 0.18 | — | — |
| Example 22 | 85 | 0.20 | APS | 0.006 | APFH | 55.0 | PMVE | 0.01 | — | — |
| Example 23 | 70 | 0.83 | APS | 0.110 | PMPA | 27.5 | CNVE | 1.12 | Ethane | 0.03 |
| Example 24 | 85 | 0.83 | APS | 0.110 | APFH | 55.0 | PPVE | 8.80 | Ethane | 0.03 |
| Example 25 | 85 | 0.83 | APS | 0.110 | APFH | 55.0 | PPVE | 5.90 | Ethane | 0.02 |
| Comparative Example 1 | 85 | 0.83 | APS | 0.006 | PMPA | 8.3 | — | — | Ethane | 0.03 |

TABLE 2

|  | Volume average particle size nm | MV (×10³) Pa·S | MFR g/10 min | Modified amount Type | Modified amount Amount Mol % | Melting point °C. | Solids content Mass % | Dispersion stability* Storage stability (Sediment amount) Mass % | Dispersion stability* Mechanical stability (Mesh-up amount) Mass % |
|---|---|---|---|---|---|---|---|---|---|
| Example 1 | 0.9 | 3.0 | Not measured | — | — | 327.0 | 20.5 | 0.1 | 0.1 |
| Example 2 | 2.3 | 8.0 | Not measured | — | — | 328.4 | 21.1 | 0.1 | 0.2 |
| Example 3 | 5.3 | Unmeasurable | Not measured | — | — | 331.1 | 21.4 | 1.2 | 0.5 |
| Example 4 | 4.2 | Unmeasurable | Not measured | — | — | 331.2 | 17.0 | 2.3 | 0.8 |
| Example 5 | 1.2 | 15.8 | Not measured | — | — | 329.3 | 21.4 | 0.2 | 0.2 |
| Example 6 | 5.7 | Unmeasurable | Not measured | — | — | 330.8 | 25.0 | 2.4 | 0.8 |
| Example 7 | 4.8 | Unmeasurable | Not measured | — | — | 328.8 | 1.5 | 0.1 | 0.1 |
| Example 8 | 2.3 | Unmeasurable | Not measured | — | — | 329.3 | 6.5 | 0.2 | 0.2 |
| Example 9 | 4.7 | Unmeasurable | Not measured | — | — | 328.5 | 7.5 | 0.2 | 0.7 |
| Example 10 | 6.5 | Unmeasurable | Not measured | — | — | 329.0 | 7.1 | 2.1 | 1.0 |
| Example 11 | 12.1 | Unmeasurable | Not measured | — | — | 328.2 | 7.1 | 5.1 | 1.7 |
| Example 12 | 19.5 | Unmeasurable | Not measured | — | — | 328.8 | 7.1 | 7.8 | 2.2 |
| Example 13 | 3.1 | Unmeasurable | Not measured | — | — | 331.1 | 19.7 | 0.3 | 0.5 |
| Example 14 | 1.3 | Unmeasurable | Not measured | CNVE | 0.20 | 327.0 | 19.9 | 0.1 | 0.1 |
| Example 15 | 11.8 | Unmeasurable | Not measured | CNVE | 0.18 | 329.4 | 20.9 | 0.2 | 0.3 |
| Example 16 | 1.6 | Unmeasurable | Not measured | CNVE | 0.24 | 331.4 | 19.8 | 0.1 | 0.2 |
| Example 17 | 1.9 | Unmeasurable | Not measured | PFHE | 0.07 | 329.0 | 19.5 | 0.1 | 0.2 |
| Example 18 | 7.6 | Unmeasurable | Not measured | HFP | 0.10 | 334.9 | 20.3 | 2.7 | 1.2 |
| Example 19 | 1.4 | Unmeasurable | Not measured | PMVE | 0.20 | 334.7 | 6.6 | 0.1 | 0.2 |
| Example 20 | 1.2 | Unmeasurable | Not measured | PPVE | 0.26 | 326.1 | 6.6 | 0.1 | 0.2 |
| Example 21 | 7.1 | Unmeasurable | Not measured | CTFE | 0.27 | 332.8 | 6.6 | 2.5 | 1.1 |
| Example 22 | 3.5 | Unmeasurable | Not measured | PMVE | 0.02 | 331.6 | 6.4 | 0.3 | 0.5 |
| Example 23 | 0.8 | Unmeasurable | Not measured | CNVE | 0.60 | 329.6 | 21.2 | 0.1 | 0.2 |
| Example 24 | 6.0 | Not measured | 230 | PPVE | 1.49 | 319.7 | 18.5 | 2.0 | 0.7 |

TABLE 2-continued

|  | Volume average particle size nm | MV (×10³) Pa·S | MFR g/10 min | Modified amount Type | Modified amount Amount Mol % | Melting point °C. | Solids content Mass % | Dispersion stability* Storage stability (Sediment amount) Mass % | Dispersion stability* Mechanical stability (Mesh-up amount) Mass % |
|---|---|---|---|---|---|---|---|---|---|
| Example 25 | 6.1 | Not measured | 87 | PPVE | 1.21 | 313.6 | 18.7 | 2.2 | 0.8 |
| Comparative Example 1 | 121.6 | Unmeasurable | Not measured | — | — | 327.6 | 7.1 | 22.9 | 5.3 |

*In Example 7, performed at solids content 1.0 mass %

INDUSTRIAL APPLICABILITY

The method of producing a fluoropolymer aqueous dispersion of the present invention can provide an aqueous dispersion which contains fluoropolymer particles having a significantly small particle size and which is excellent in dispersion stability without using a long-chain fluorosurfactant. The fluoropolymer aqueous dispersion produced by the production method of the present invention and the fluoropolymer fine powder produced from the aqueous dispersion can suitably be used as additives for a variety of molding material, coating material, cosmetics, wax, grease, and toners; electrode binders for secondary batteries and fuel cells; hardness adjustors for electrode binders; water-repellents; and the like.

The invention claimed is:

1. A method of producing an aqueous dispersion containing at least one fluoropolymer selected from the group consisting of polytetrafluoroethylene and tetrafluoroethylene/perfluoro(alkyl vinyl ether) copolymers, the method comprising
polymerizing a fluoromonomer in an aqueous medium in the presence of a fluorosurfactant having a Log POW value of not higher than 3.4 and a polymerization initiator and at least one of a modifying monomer and a chain-transfer agent,
the amount of the fluorosurfactant corresponding to 18000 to 500000 ppm of the aqueous medium,
wherein the modifying monomer is at least one selected from the group consisting of hexafluoropropylene, chlorotrifluoroethylene, vinylidene fluoride, perfluoropropyl vinyl ether, perfluorobutylethylene, ethylene, perfluoromethyl vinyl ether, perfluorohexylethylene and a fluorinated vinyl ether represented by the formula $CF_2=CFORf^9CN$ wherein $Rf^9$ represents a C2-C7 alkylene group in which an oxygen atom may optionally be inserted between two carbon atoms,
the chain-transfer agent is at least one selected from the group consisting of methane, ethane, propane, butane, chloromethane, dichloromethane, difluoroethane, methanol, ethanol and hydrogen,
the amount of the modifying monomer is 0.02-1.49 mol % based on the sum of the amounts of the monomers supplied, and
the amount of the chain-transfer agent is 159-3000 ppm based on the sum of the amounts of the monomers supplied.

2. The method of producing a fluoropolymer aqueous dispersion according to claim 1,
wherein the fluorosurfactant is a fluorinated compound represented by the following formula (1):

$$X-(CF_2)_{m1}-Y \quad (1)$$

wherein X represents H or F; m1 is an integer of 3 to 5; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group.

3. The method of producing a fluoropolymer aqueous dispersion according to claim 1,
wherein the polymerization is performed in the absence of a fluorinated compound represented by the following formula (2):

$$X-(CF_2)_{m2}-Y \quad (2)$$

wherein X represents H or F; m2 is an integer of 6 or greater; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group.

4. The method of producing a fluoropolymer aqueous dispersion according to claim 1,
wherein the fluoropolymer has a volume average particle size of not smaller than 0.1 nm but smaller than 20 nm.

5. The method of producing a fluoropolymer aqueous dispersion according to claim 1,
wherein the polymerization initiator is at least one selected from the group consisting of persulfates and organic peroxides.

6. The method of producing a fluoropolymer aqueous dispersion according to claim 1,
wherein the amount of the polymerization initiator corresponds to 1 to 5000 ppm of the aqueous medium.

* * * * *